(12) United States Patent
Eslami et al.

(10) Patent No.: US 11,456,535 B2
(45) Date of Patent: Sep. 27, 2022

(54) RADIO FREQUENCY (RF) AMPLIFIER CIRCUIT FOR ANTENNA SYSTEMS HAVING A MODAL ANTENNA

(71) Applicant: AVX Antenna, Inc., San Diego, CA (US)

(72) Inventors: Hamid Eslami, San Diego, CA (US); Abhishek Singh, San Diego, CA (US); Jeffrey L. Hilbert, San Diego, CA (US); Jesse Shihchieh Hsin, San Diego, CA (US)

(73) Assignee: KYOCERA AVX COMPONENTS (SAN DIEGO), INC., San Diego, CA (US)

( * ) Notice: Subject to any disclaimer, the term of this patent is extended or adjusted under 35 U.S.C. 154(b) by 0 days.

(21) Appl. No.: 17/147,780

(22) Filed: Jan. 13, 2021

(65) Prior Publication Data

US 2021/0234274 A1 Jul. 29, 2021

Related U.S. Application Data

(60) Provisional application No. 62/965,385, filed on Jan. 24, 2020.

(51) Int. Cl.
| | |
|---|---|
| *H04B 1/40* | (2015.01) |
| *H04B 1/44* | (2006.01) |
| *H01Q 3/44* | (2006.01) |
| *H01Q 5/378* | (2015.01) |
| *H01Q 13/20* | (2006.01) |
| *H04B 1/04* | (2006.01) |

(52) U.S. Cl.
CPC .......... *H01Q 5/378* (2015.01); *H01Q 13/206* (2013.01); *H04B 1/04* (2013.01); *H04B 2001/0408* (2013.01)

(58) Field of Classification Search
CPC ... H04B 1/04; H04B 1/38; H04B 1/40; H04B 1/44; H04B 2001/0408; H01Q 1/246; H01Q 1/422; H01Q 1/521; H01Q 5/378; H01Q 9/285; H01Q 21/062; H01Q 21/28; H01Q 25/04; H01Q 1/38
See application file for complete search history.

(56) References Cited

U.S. PATENT DOCUMENTS

| | | | | |
|---|---|---|---|---|
| 4,636,741 | A | * | 1/1987 | Mitzlaff ................ H03F 1/0216 455/99 |
| 5,590,703 | A | * | 1/1997 | Eckert .................... B22D 11/12 164/476 |
| 6,320,548 | B1 | | 11/2001 | Harrell et al. |

(Continued)

OTHER PUBLICATIONS

International Search Report and Written Opinion for Application No. PCT/US2021/013186, dated May 12, 2021, 9 pages.

*Primary Examiner* — Blane J Jackson
(74) *Attorney, Agent, or Firm* — Dority & Manning, P.A.

(57) ABSTRACT

An antenna system is provided. The antenna system includes a modal antenna disposed on a circuit board. The modal antenna includes a driven element and a parasitic element. The modal antenna is operable in a plurality of different modes. Each of the plurality of modes has a distinct radiation pattern. The antenna system further includes a radio frequency amplifier circuit disposed on the circuit board. The radio frequency amplifier circuit is coupled between the drive element of the modal antenna and a transmission line.

18 Claims, 4 Drawing Sheets

(56) References Cited

U.S. PATENT DOCUMENTS

| | | | |
|---|---|---|---|
| 6,326,922 B1 | 12/2001 | Hegendoerfer | |
| 7,911,402 B2* | 3/2011 | Rowson | H01Q 9/0421 |
| | | | 343/745 |
| 9,065,496 B2* | 6/2015 | Rowson | H04B 7/10 |
| 9,231,669 B2* | 1/2016 | Desclos | H01Q 1/243 |
| 9,391,570 B2* | 7/2016 | Kong | H04B 1/401 |
| 9,425,497 B2* | 8/2016 | Pajona | H01Q 19/28 |
| 9,491,713 B2* | 11/2016 | Dykyy | H04W 52/16 |
| 10,021,652 B2* | 7/2018 | Gossner | H04W 16/28 |
| 10,263,817 B1* | 4/2019 | Roe | H01Q 3/28 |
| 10,998,615 B1* | 5/2021 | van Erven | G06F 3/167 |
| 2014/0148214 A1* | 5/2014 | Sasson | H01Q 1/32 |
| | | | 455/522 |
| 2019/0394072 A1 | 12/2019 | Roe et al. | |
| 2020/0058989 A1 | 2/2020 | Eslami et al. | |

* cited by examiner

RADIO FREQUENCY (RF) AMPLIFIER CIRCUIT FOR ANTENNA SYSTEMS HAVING A MODAL ANTENNA

PRIORITY CLAIM

The present application claims the benefit of priority of U.S. Provisional App. No. 62/965,385, titled "Radio Frequency (RF) Amplifier Circuit for Antenna Systems Having a Modal Antenna," having a filing date of Jan. 24, 2020, which is incorporated by reference herein.

FIELD

The present disclosure relates generally to antenna systems and, more particularly, to a RF amplifier circuit for antenna systems having modal antennas.

BACKGROUND

Modal antennas are being increasingly used in wireless communication, for instance in smartphone handsets. Such antennas generally provide improved signal quality and a more compact form factor than traditional passive antennas. Modal antennas include a parasitic element configured to alter a radiation pattern associated with a driven element. In this manner, modal antennas can be configurable in a plurality of different modes. Furthermore, each of the plurality of modes can have a distinct radiation pattern and/or polarization.

SUMMARY

Aspects and advantages of embodiments of the present disclosure will be set forth in part in the following description, or may be learned from the description, or may be learned through practice of the embodiments.

In one aspect, an antenna system is provided. The antenna system includes a modal antenna disposed on a circuit board. The modal antenna includes a driven element and a parasitic element. The modal antenna is operable in a plurality of different modes. Each of the plurality of modes has a distinct radiation pattern. The antenna system further includes a radio frequency amplifier circuit disposed on the circuit board. The radio frequency amplifier circuit is coupled between the drive element of the modal antenna and a transmission line.

In another aspect, an antenna system is provided. The antenna system include a modal antenna disposed on a first circuit board. The modal antenna includes a driven element and a parasitic element. The modal antenna is operable in a plurality of different modes. Each of the plurality of modes has a distinct radiation pattern. The antenna system further includes a radio frequency circuit disposed on the first circuit board. The radio frequency circuit is coupled between the driven element and a transmission line coupling the first circuit board to a second circuit board.

In yet another aspect, a method for controlling operation of an antenna system having a modal antenna and a radio frequency amplifier circuit disposed on the same circuit board is provided. The method includes obtaining, via a driven element of the modal antenna, a radio frequency signal. The method includes amplifying, via the radio amplifier circuit coupled between the driven element and a single coaxial transmission line, the radio frequency signal to generate an amplified radio frequency signal. The method includes providing, via the single coaxial transmission line, the amplified radio frequency signal to radio frequency circuitry of the antenna system.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to an antenna assembly. The antenna assembly can include a modal antenna disposed on a circuit board. The modal antenna can include a parasitic element and a driven element. The modal antenna can be configurable in a plurality of different modes. Each of the plurality of modes can have a distinct radiation pattern. As will be discussed below, the antenna assembly can further include a radio frequency (RF) amplifier circuit disposed on the circuit board to amplify RF signals received via the driven element of the modal antenna.

In some implementations, the RF amplifier circuit can include a low-noise amplifier. The low-noise amplifier can be in electrical communication with the driven element. In this manner, a RF signal received via the driven element of the modal antenna can be provided to the low-noise amplifier. The low-noise amplifier can be configured to amplify the RF signal. The amplified RF signal can then be provided to RF circuitry (e.g., RF front-end module) of the antenna system for further processing. In some implementations, the amplified RF signal can be provided to the RF circuitry via a transmission line (e.g., coaxial cable). For instance, in some implementations, the RF circuitry can be disposed on a different circuit board than the RF amplifier circuit. In such implementations, the transmission line can provide a communication link between the two circuit boards. In alternative implementations, the RF circuitry and the RF amplifier circuit can be disposed on the same circuit board. In such implementations, the transmission line can facilitate communication between the RF amplifier and the RF circuitry.

In some implementations, the antenna system can include one or more control devices. The one or more control devices can be operatively coupled to the RF amplifier circuit via the transmission line. In this manner, the one or more control devices can provide one or more control signals to the RF amplifier circuit via the transmission line. For instance, in some implementations, the one or more control signals can be associated with controlling operation of the low-noise amplifier. In this manner, operation of the low-noise amplifier can be controlled without requiring a separate communication line to accommodate the one or more control signals.

In some implementations, the RF amplifier circuit can include a first switching device and a second switching device. The first switching device can be coupled between the low-noise amplifier and the driven element of the modal antenna. In this manner, the low-noise amplifier can be selectively coupled to the driven element of the modal antenna via the first switching device. The second switching device can be coupled between the low-noise amplifier and the transmission line. In this manner, the low-noise amplifier can be selectively coupled to the transmission line via the second switching device.

In some implementations, the RF amplifier circuit can include a third switching device coupled between the transmission line and the driven element of the modal antenna. For instance, the RF circuitry can be coupled to the driven element of the modal antenna via the third switching device. In this manner, one or more RF signals the RF circuit provides to the driven element of the modal antenna can bypass the low-noise amplifier of the RF amplifier circuit. In some implementations, the one or more control signals the one or more control devices provide to the RF amplifier circuit can be associated with controlling operation of at least one of the switching devices (e.g., first switching device, second switching device, third switching device) of the RF amplifier circuit.

The antenna assembly according to example aspects of the present disclosure can have numerous technical effects and benefits. For instance, since the RF amplifier circuit is on the same circuit board as the modal antenna, RF signals received via the driven element of the modal antenna are not provided to the RF amplifier circuit via a transmission line (e.g., coaxial cable). As such, attenuation of the RF signals due, at least in part, to a noise figure (e.g., about 1 decibel (dB) to about 1.5 dB) associated with the transmission line can be eliminated. In this manner, the performance (e.g., receiver sensitivity) of the antenna system can be improved. Furthermore, using the transmission line to communicate one or more control signals associated with controlling operation of the RF amplifier circuit eliminates the need for having two separate transmission lines, one to accommodate the output (e.g., amplified RF signal) of the low-noise amplifier and another to accommodate the one or more control signals associated with controlling operation of the low-noise amplifier.

As used herein, the terms "first", "second", and "third" may be used interchangeably to distinguish one component from another and are not intended to signify location or importance of the individual components.

Figure 1:
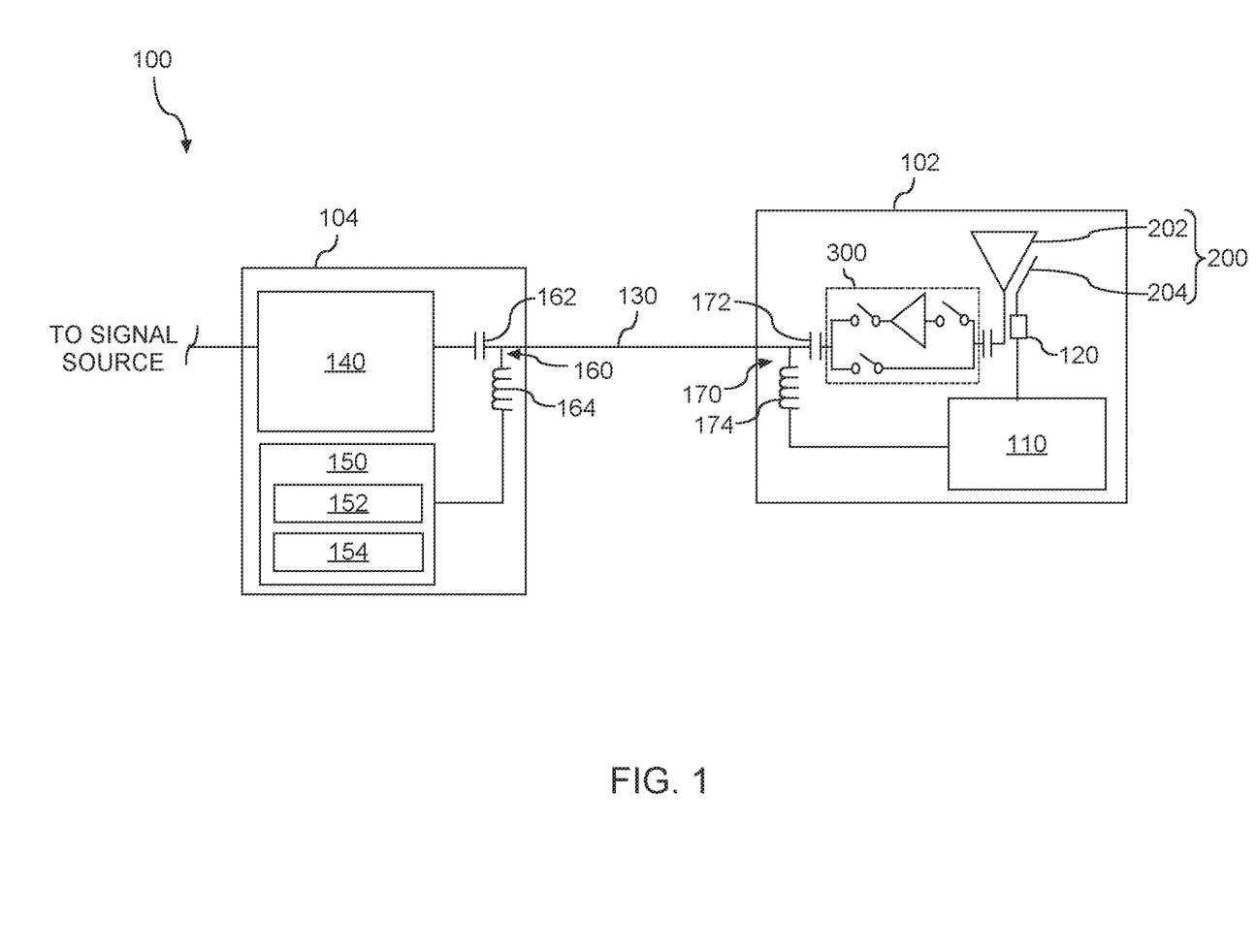
FIG. 1 depicts a block diagram of components of an antenna system according to example embodiments of the present disclosure.

Referring now to the FIGS., FIG. 1 depicts an antenna system 100 according to example embodiments of the present disclosure. As shown, the antenna system 100 can include a modal antenna 200 disposed on a first circuit board 102 (e.g., antenna board). The modal antenna 200 can include a driven element 202 and a parasitic element 204. The parasitic element 204 can be positioned proximate the driven element 202 on the first circuit board 102. The modal antenna 200 can be configurable in a plurality of different modes. Each of the plurality of modes can be associated with a different radiation pattern and/or polarization. In this manner, the modal antenna 200 can provide beam steering functionality to improve link quality with one or more remote devices (e.g., router, cell tower, etc.) in communication with the antenna system 100.

Although the antenna system 100 is depicted as having only one modal antenna 200, it should be understood that the antenna system 100 can include any suitable number of modal antennas. For instance, in some implementations, the antenna system 100 can include two or more modal antennas.

The antenna system 100 can include a tuning circuit 110 disposed on the first circuit board 102. The tuning circuit 110 can be configured to control an electrical characteristic associated with the parasitic element 204 to operate the modal antenna 200 in the plurality of different modes. In some implementations, the antenna system 100 can include a tunable component 120 disposed on the first circuit board 102. As shown, the tunable component 120 can be coupled between the tuning circuit 110 and the parasitic element 204 of the modal antenna 200. The tuning circuit 110 can be configured to control operation of the tunable component 120 to alter the electrical connectivity of the parasitic element 204 with a voltage or current source or sink, such as coupling the parasitic element 204 to an electrical ground.

Figure 2:
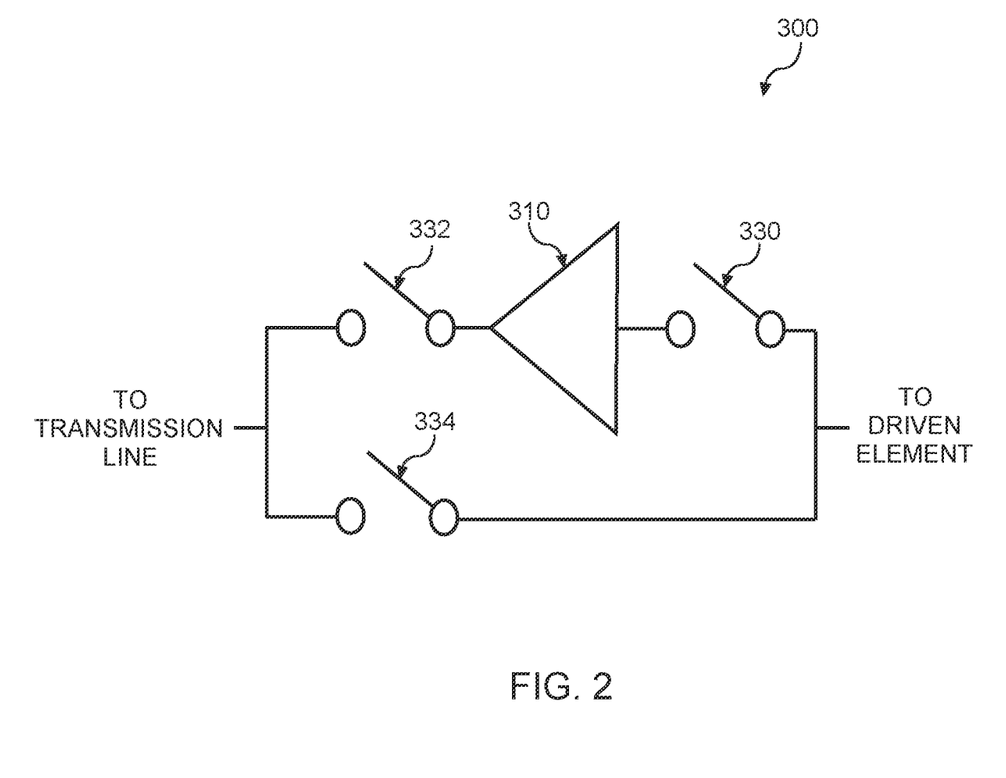
FIG. 2 depicts a RF amplifier circuit according to example embodiments of the present disclosure.

Referring now to FIGS. 1 and 2, the antenna system 100 can include a RF amplifier circuit 300 disposed on the first circuit board 102. The RF amplifier circuit 300 can be in electrical communication with the driven element 202 of the modal antenna 200. As shown, the RF amplifier circuit 300 can include a low-noise amplifier 310. The low-noise amplifier 310 can be configured to amplify a RF signal received via the driven element 202 of the modal antenna 200.

In some implementations, the RF amplifier circuit 300 can include a first switching device 330 and a second switching device 332. As shown, the first switching device 330 can be coupled between the low-noise amplifier 310 and the driven element 202 of the modal antenna 200. In this manner, the low-noise amplifier 310 can be selectively coupled to the driven element 202 of the modal antenna 200 via the first switching device 330. The second switching device 332 can be coupled between the low-noise amplifier 310 and a transmission line 130. In some implementations, the transmission line 130 can be a coaxial cable.

It should be appreciated that having the RF amplifier circuit 300 on the same circuit board (e.g., first circuit board 102) as the modal antenna 200 can improve performance (e.g., noise figure) of the antenna system 100. For instance, RF signals received via the driven element 202 of the modal antenna 200 are not provided to the RF amplifier circuit 300 via the transmission line 130. In this manner, the sensitivity of the antenna system 100 can be improved, because attenuation of the RF signals due, at least in part, to losses associated with the transmission line 130 are eliminated since the RF signals are not provided to the RF amplifier circuit 300 via the transmission line 130.

As shown, the transmission line 130 can, in some implementations, be coupled between the first circuit board 102 and a second circuit board 104 of the antenna system 100. In this manner, the second switching device 332 can selectively couple the low-noise amplifier 310 to the transmission line 130 to facilitate transmission of the output (e.g., amplified RF signal) of the low-noise amplifier 310 to one or more components disposed on the second circuit board 104.

The antenna system 100 can include RF circuitry 140. As shown, the RF circuitry 140 can, in some implementations, be disposed on the second circuit board 104. In alternative implementations, the RF circuitry 140 can be disposed on the first circuit board 102 (e.g., antenna board). The RF circuitry 140 can include a front end module. The front end module can include, for instance, one or more power amplifiers, low noise amplifiers, impedance matching circuits, etc. In some implementations, the RF circuitry 140 can be configured to process the output (e.g., amplified RF signal) of the low-noise amplifier 310. As will be discussed below, the RF circuitry 140 can be further configured to transmit a RF signal to the modal antenna 200 via the transmission line 130.

In some implementations, the RF signal transmitted by the RF circuitry 140 can be provided to the driven element 202 of the modal antenna 200 via the low-noise amplifier 310. In this manner, the low-noise amplifier 310 can amplify the RF signal before the RF signal is transmitted via the driven element 202 of the modal antenna 200. As will be discussed below, in some implementations, the RF signal transmitted by the RF circuitry 140 can bypass the low-noise amplifier 310.

In some implementations, the RF amplifier circuit 300 can include a third switching device 334 coupled between the transmission line 130 and the driven element 202 of the modal antenna 200. In such implementations, the RF signal transmitted by the RF circuitry 140 can, for example, be provided to the driven element 202 of the modal antenna 200 via the third switching device 334. In this manner, the RF signal transmitted by the RF circuitry 140 can bypass the low-noise amplifier 310 of the RF amplifier circuit 300 such that the RF signal is not amplified via the low-noise amplifier 310 before being transmitted via the driven element 202 of the modal antenna 200.

It should be appreciated that the switching devices (e.g., first switching device 330, second switching device 332, third switching device 334) of the RF amplifier circuit 300 can include any suitable type of switching device. For instance, in some implementations, the switching devices can include one or more contactors. Alternatively, the switching devices can include one or more transistors, one or more silicon controlled rectifier (SCR), or one or more TRIACs.

The antenna system 100 can include one or more control devices 150. As shown, the one or more control devices 150 can, in some implementations, be disposed on the second circuit board 104. In alternative implementations, the one or more control devices 150 can be disposed on the first circuit board 102. The one or more control devices 150 can be operatively coupled to the tuning circuit 110 via the transmission line 130. In this manner, the one or more control devices 550 can be configured to control operation of the tuning circuit 110 to configure the modal antenna 200 in the plurality of different modes. Alternatively and/or additionally, the one or more control devices 150 can be in electrical communication with the RF circuitry 540. In this manner, RF signals received via the driven element 202 of the modal antenna 200 can be provided to the one or more control devices 150 via the RF circuitry 140. In addition, the one or more control devices 150 can provide data to be modulated onto the RF signal transmitted by the RF circuitry 140.

In some implementations, the one or more control devices 150 can be operatively coupled to the RF amplifier circuit 300 via the transmission line 130. In this manner, the one or more control devices 150 can be configured to provide one or more control signals to the RF amplifier circuit 300 via the transmission line 130. For instance, in some implementations, the one or more control signals can be associated with controlling operation of the low-noise amplifier 310 of the RF amplifier circuit 300. Alternatively, or additionally, the one or more control signals can be associated with controlling operation of the switching devices (e.g., first switching device 330, second switching device 332, third switching device 334) of the RF amplifier circuit 300.

As shown, the one or more control devices 150 can include one or more processors 152 and one or more memory devices 154. The one or more processors 152 can include any suitable processing device, such as a microprocessor, microcontroller, integrated circuit, logic device, or other suitable processing device. The one or more memory devices 154 can include one or more computer-readable media, including, but not limited to, non-transitory computer-readable media, RAM, ROM, hard drives, flash drives, or other memory devices.

The one or more memory devices 154 can store information accessible by the one or more processors 152, including computer-readable instructions that can be executed by the one or more processors 152. The computer-readable instructions can be any set of instructions that, when executed by the one or more processors, cause the one or more processors 152 to perform operations. The computer-readable instructions can be software written in any suitable programming language or may be implemented in hardware. In some embodiments, the computer-readable instructions can be executed by the one or more processors 152 to cause the one or more processors 152 to perform operations, such as controlling operation of the modal antenna 200 and/or the RF amplifier circuit 300.

In some implementations, the transmission line 130 can be coupled with various components (e.g., using Bias Tee circuits) that are configured to aid in the combination and/or separation of signals occupying various frequency bands. For example, the transmission line 130 can be coupled to the RF circuitry 140 and the one or more control devices 150 via a first bias Tee circuit 160. As shown, the first bias Tee circuit 160 can include a capacitor 162 and an inductor 164. The transmission line 130 can be coupled to the RF circuitry 140 via the capacitor 162 of the first bias Tee circuit 160. In this manner, RF signals transmitted by the RF circuitry 140 can be provided to the transmission line 130 via the capacitor 162 of the first bias Tee circuit 160. The transmission line 130 can be coupled to the one or more control devices 150 via the inductor 164 of the first bias Tee circuit 160. In this manner, the one or more control signals transmitted by the one or more control devices 150 can be provided to the transmission line 130 via the inductor 164 of the first bias Tee circuit 160.

In some implementations, the transmission line 130 can be coupled to the RF amplifier circuit 300 and the tuning circuit 110 via a second bias Tee circuit 170. As shown, the second bias Tee circuit 170 can include a capacitor 172 and an inductor 174. The transmission line 130 can be coupled to the RF amplifier circuit 300 via the capacitor 172 of the second bias Tee circuit 170. In this manner, RF signals transmitted by the RF circuitry 140 can be provided to the RF amplifier circuit 300 via the capacitor 172 of the second bias Tee circuit 170. Likewise, the one or more control signals transmitted by the one or more control devices 150 can be provided to the RF amplifier circuit 300 via the capacitor 172 of the second bias Tee circuit 170. Furthermore, the output (e.g., amplified RF signal) of the RF amplifier circuit 300 can be provided to the transmission line 130 via the capacitor 172 of the second bias Tee circuit 170. Still further, the transmission line 130 can be coupled to the tuning circuit 110 via the inductor 174 of the second bias Tee circuit 170. In this manner, the one or more control signals transmitted by the one or more control devices 150 can be provided to the tuning circuit 110 via the inductor 174 of the second bias Tee circuit 170.

Figure 3:
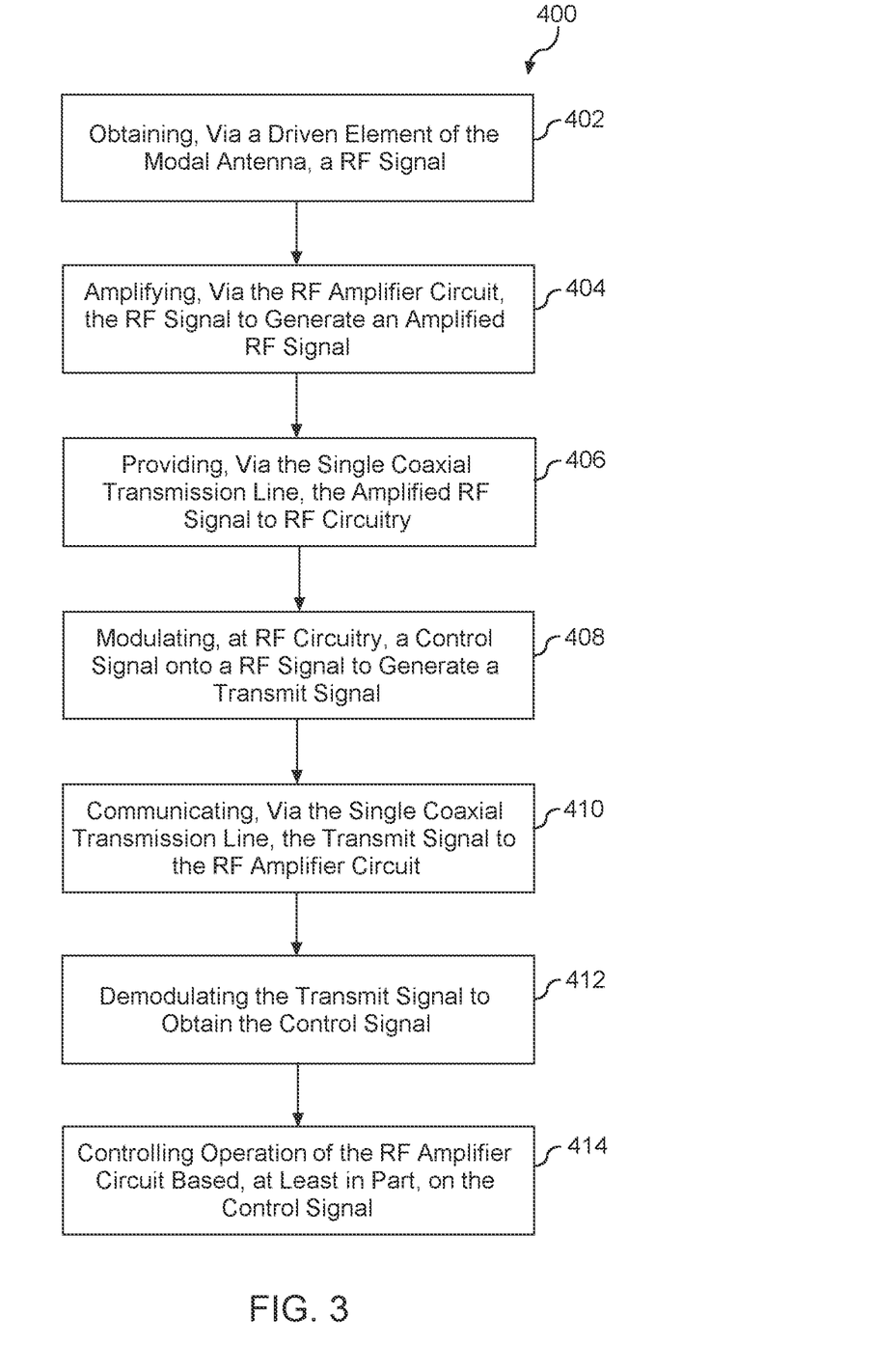
FIG. 3 depicts a flow diagram of a method for controlling operation of an antenna system according to example embodiments of the present disclosure.

FIG. 3 depicts a flow diagram of an example method 400 for controlling operation of an antenna system according to example embodiments of the present disclosure. FIG. 3 depicts steps performed in a particular order for purposes of illustration and discussion. Those of ordinary skill in the art, using the disclosures provided herein, will understand that various steps of the method 400 described herein can be omitted, expanded, performed simultaneously, rearranged, and/or modified in various ways without deviating from the scope of the present disclosure. In addition, various steps (not illustrated) can be performed without deviating from the scope of the present disclosure. Additionally, the method 400 is generally discussed with reference to the antenna system 100 discussed above with reference to FIGS. 1 and 2.

At (402), the method 400 can include obtaining, via a driven element of the modal antenna disposed on a circuit board, a RF signal. At (404), the method 400 can include amplifying, via the RF amplifier circuit disposed on the circuit board and coupled between the driven element and a single coaxial transmission line, the RF signal to generate an amplified RF signal. In some implementations, the RF amplifier circuit can include a low-noise amplifier. The RF signal obtained at (402) can be provided as an input to the RF amplifier circuit. Furthermore, the output of the low-noise amplifier can be the amplified RF signal.

At (406), the method 400 can include providing, via the single coaxial transmission line, the amplified RF signal to RF circuitry of the antenna system. At (408), the method 400 can include modulating, at RF circuitry of the antenna system, a control signal onto a RF signal to generate a transmit signal. In some implementations, the control signal can be associated with controlling operation of the RF amplifier circuit.

At (410), the method 400 can include communicating, via the single coaxial transmission line, the transmit signal to the RF amplifier circuit. In some implementations, the transmit signal can be provided to the RF amplifier circuit via a tee circuit coupling the single coaxial transmission line to the RF amplifier circuit. At (412), the method 400 can include demodulating the transmit signal to obtain the control signal.

At (414), the method 400 can include controlling operation of the RF amplifier circuit based, at least in part, on the control signal. For instance, in some implementations, controlling operation of the RF amplifier circuit can include controlling operation of one or more switching devices of the RF amplifier circuit based, at least in part, on the control signal. Alternatively or additionally, controlling operation of the RF amplifier circuit can include controlling operation of a low-noise amplifier of the RF amplifier circuit based, at least in part, on the control signal.

Figure 4:
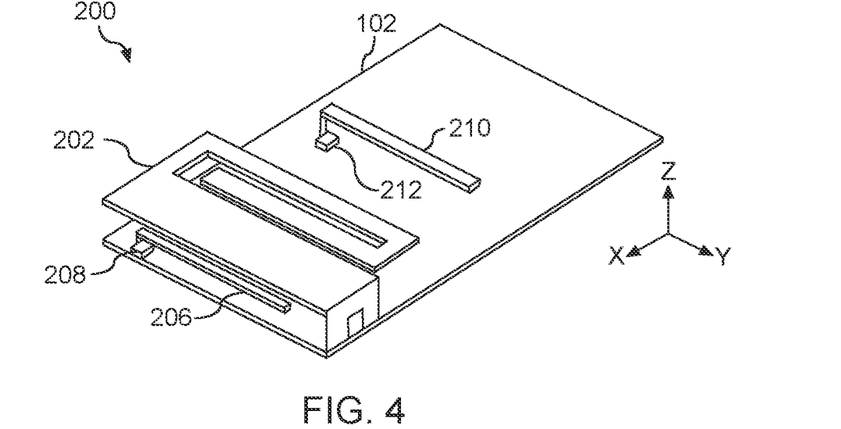
FIG. 4 depicts a modal antenna according to example embodiments of the present disclosure.

FIG. 4 illustrates an example embodiment of the modal antenna 200 according to the present disclosure. As shown, the driven element 202 of the modal antenna 200 can be disposed on the first circuit board 102. An antenna volume may be defined between the first circuit board 102 (e.g., and the ground plane) and the driven element 202. The modal antenna 200 can include a first parasitic element 206 positioned at least partially within the antenna volume. The modal antenna 200 can further include a first tuning element 208 coupled with the first parasitic element 206. The first tuning element 208 can be a passive or active component or series of components and can be configured to alter a reactance on the first parasitic element 206 either by way of a variable reactance or shorting to ground. It should be appreciated that altering the reactance of the first parasitic element 206 can result in a frequency shift of the modal antenna 200. It should also be appreciated that the first tuning element 208 can include at least one of a tunable capacitor, MEMS device, tunable inductor, switch, a tunable phase shifter, a field-effect transistor, or a diode.

In some implementations, the modal antenna 200 can include a second parasitic element 210 disposed adjacent the driven element 202 and outside of the antenna volume. The modal antenna 200 can further include a second tuning element 212. In some implementations, the second tuning element 212 can be a passive or active component or series of components and may be configured to alter a reactance on the second parasitic element 210 by way of a variable reactance or shorting to ground. It should be appreciated that altering the reactance of the second parasitic element 210 can result in a frequency shift of the modal antenna 200. It should also be appreciated that the second tuning element 212 can include at least one of a tunable capacitor, MEMS device, tunable inductor, switch, a tunable phase shifter, a field-effect transistor, or a diode.

In some implementations, operation of at least one of the first tuning element 208 and the second tuning element 212 can be controlled to adjust (e.g., shift) the antenna radiation pattern of the driven element 202. For example, a reactance of at least one of the first tuning element 208 and the second tuning element 212 can be controlled to adjust the antenna radiation pattern of the driven element 202. Adjusting the antenna radiation pattern can be referred to as "beam steering". However, in instances where the antenna radiation pattern includes a null, a similar operation, commonly referred to as "null steering", can be performed to shift the null to an alternative position about the driven element 202 (e.g., to reduce interference).

Figure 5:
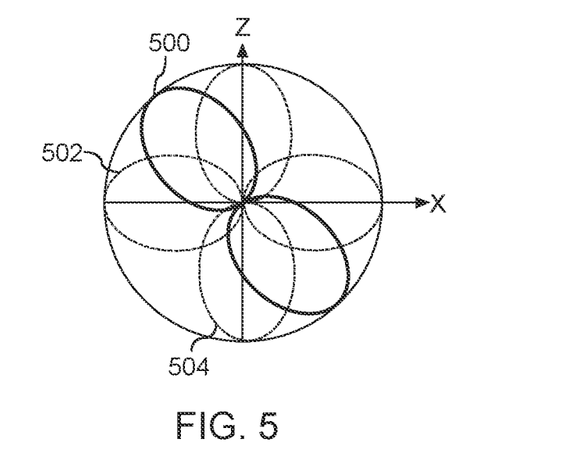
FIG. 5 depicts a two-dimensional radiation pattern associated with a modal antenna according to example embodiments of the present disclosure.

FIG. 5 depicts antenna radiation patterns associated with the modal antenna 200 of FIG. 4 according to example embodiments of the present disclosure. It should be appreciated that operation of at least one of the first parasitic element 206 and the second parasitic element 210 can be controlled to configure the modal antenna 200 in a plurality of modes. It should also be appreciated that the modal antenna 200 can have a distinct antenna radiation pattern or antenna polarization when configured in each of the plurality of modes.

In some implementations, the modal antenna 200 can have a first antenna radiation pattern 500 when the modal antenna 200 is configured in a first mode of the plurality of modes. In addition, the modal antenna 200 can have a second antenna radiation pattern 502 when the modal antenna 200 is configured in a second mode of the plurality of modes. Furthermore, the modal antenna 200 can have a third antenna radiation pattern 504 when the modal antenna 200 is configured in a third mode of the plurality of modes.

As shown, the first antenna radiation pattern 500, the second antenna radiation pattern 502, and the third antenna radiation pattern 504 can be distinct from one another. In this manner, the modal antenna 200 can have a distinct radiation pattern when configured in each of the first mode, second mode, and third mode.

Figure 6:
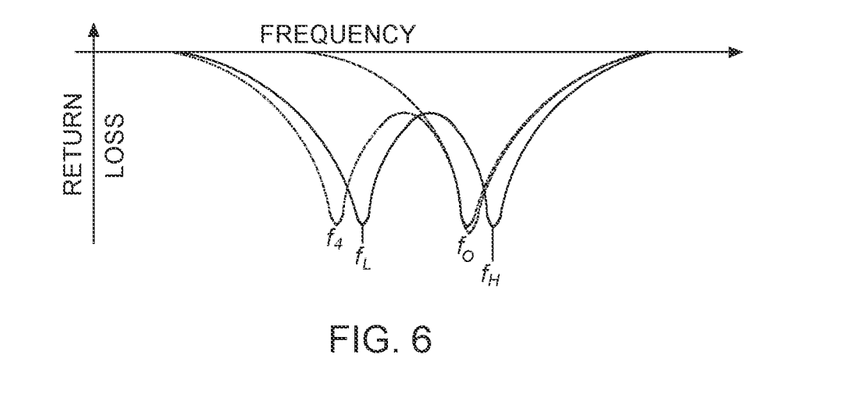
FIG. 6 depicts a frequency plot of a modal antenna according to example embodiments of the present disclosure.

FIG. 6 depicts an example frequency plot of the modal antenna 200 of FIG. 3 according to some aspects of the present disclosure. It should be understood that an electrical characteristic (e.g., reactance) of at least one of the first parasitic element 206 and the second parasitic element 210 can be controlled. In this manner, the electrical characteristic of at least one of the first parasitic element 206 and the second parasitic element 210 can be adjusted to shift a frequency at which the modal antenna 200 is operating.

In some implementations, the modal antenna 200 can be tuned to a first frequency $f_0$ when the first parasitic element 206 and the second parasitic element 210 are deactivated (e.g., switched off). Alternatively and/or additionally, the modal antenna 200 can be tuned to frequencies $f_L$ and $f_H$ when the second parasitic element 210 is shorted to ground. Furthermore, the modal antenna 200 can be tuned to frequency $f_4$ when both the first parasitic element 206 and the second parasitic element 210 are shorted to ground. Still further, the modal antenna 200 can be tuned to frequencies $f_4$ and $f_0$ when the first parasitic element 206 and the second parasitic element 210 are each shorted to ground. It should be understood that other configurations are within the scope of this disclosure. For example, more or fewer parasitic elements may be employed. The positioning of the parasitic elements may be altered to achieve additional modes that may exhibit different frequencies and/or combinations of frequencies.

FIGS. 4-6 depict one example modal antenna having a plurality of modes for purposes of illustration and discussion. Those of ordinary skill in the art, using the disclosures provided herein, will understand that other modal antennas and/or antenna configurations can be used without deviating from the scope of the present disclosure. As used herein a "modal antenna" refers to an antenna capable of operating in a plurality of modes where each mode is associated with a distinct radiation pattern.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An antenna system, comprising:
a modal antenna disposed on a circuit board, the modal antenna comprising a driven element and a parasitic element, the modal antenna operable in a plurality of modes, each of the plurality of modes having a distinct radiation pattern;
a radio frequency (RF) amplifier circuit disposed on the circuit board, the RF amplifier circuit coupled between a transmission line and the driven element of the modal antenna; and
one or more control devices configured to transmit one or more control signals to the RF amplifier circuit via the transmission line.

2. The antenna system of claim 1, wherein the RF amplifier circuit comprises a low-noise amplifier.

3. The antenna system of claim 2, wherein the low-noise amplifier is configured to amplify a RF signals received via the driven element of the modal antenna.

4. The antenna system of claim 2, wherein the transmission line comprises a coaxial cable.

5. The antenna system of claim 1, wherein the one or more control devices are disposed on a different circuit board than the modal antenna and the RF amplifier circuit.

6. The antenna system of claim 1, wherein the RF amplifier circuit further comprises:
a first switching device coupled between a low-noise amplifier of the RF amplifier circuit and the driven element of the modal antenna, the first switching device configured to selectively couple the low-noise amplifier to the driven element of the modal antenna; and
a second switching device coupled between the low-noise amplifier and the transmission line, the second switching device configured to selectively couple the low-noise amplifier to the transmission line.

7. The antenna system of claim 6, further comprising:
a third switching device coupled between the transmission line and the driven element, the third switching device configured to selectively couple the driven element to the transmission line to bypass the low-noise amplifier.

8. The antenna system of claim 7, wherein the one or more control signals are associated with controlling operation of at least one of the first switching device, the second switching device, or the third switching device.

9. An antenna system, comprising:
a modal antenna disposed on a first circuit board, the modal antenna comprising a driven element and a parasitic element, the modal antenna operable in a plurality of modes, each of the plurality of modes having a distinct radiation pattern;
a radio frequency (RF) amplifier circuit disposed on the first circuit board, the RF amplifier circuit coupled between the driven element of the modal antenna and a transmission line coupling the first circuit board to a second circuit board; and
one or more control devices disposed on the second circuit board, the one or more control devices configured to transmit one or more control signals to the RF amplifier circuit via the transmission line.

10. The antenna system of claim 9, wherein the transmission line comprises a coaxial cable.

11. The antenna system of claim 9, wherein the RF amplifier circuit further comprises:
a low-noise amplifier;
a first switching device coupled between the low-noise amplifier and the driven element of the modal antenna, the first switching device configured to selectively couple the low-noise amplifier to the driven element of the modal antenna; and
a second switching device coupled between the low-noise amplifier and the transmission line, the second switching device configured to selectively couple the low-noise amplifier to the transmission line.

12. The antenna system of claim 11, further comprising:
a third switching device coupled between the transmission line and the driven element, the third switching device configured to selectively couple the driven element to the transmission line.

13. The antenna system of claim 12, wherein the one or more control signals are associated with controlling operation of at least one of the first switching device, the second switching device, or the third switching device.

14. The antenna system of claim 12, further comprising:
RF circuitry configured to transmit a RF signal to the driven element of the modal antenna via the RF amplifier circuit disposed on the first circuit board.

15. The antenna system of claim 14, wherein the RF circuitry is disposed on the second circuit board.

16. The antenna system of claim 14, wherein the RF signal is transmitted to the driven element of the modal antenna via the third switching device.

17. The antenna system of claim 14, wherein the RF signal is transmitted to the drive element via the third switching device of the RF amplifier circuit such that the RF signal bypasses the low-noise amplifier of the RF amplifier circuit.

18. A method for controlling operation of an antenna system comprising a modal antenna and a RF amplifier circuit, the modal antenna and the RF amplifier circuit each disposed on a circuit board, the method comprising:
obtaining, via a driven element of the modal antenna disposed on the circuit board, a RF signal;
amplifying, via the RF amplifier circuit disposed on the circuit board and coupled between the driven element and a single coaxial transmission line, the RF signal to generate an amplified RF signal;
providing, via the single coaxial transmission line, the amplified RF signal to RF circuitry of the antenna system; and
providing, via the single coaxial transmission line, one or more control signals to the RF amplifier circuit.

* * * * *